Sept. 25, 1962 J. C. SHARP 3,055,511
COMPOSITE SIDE BOOM

Filed Feb. 5, 1962 2 Sheets-Sheet 1

INVENTOR.
JOSEPH C. SHARP

BY *Head & Johnson*

ATTORNEYS

Sept. 25, 1962　　　　　J. C. SHARP　　　　　3,055,511
COMPOSITE SIDE BOOM
Filed Feb. 5, 1962　　　　　　　　　　　　　　2 Sheets-Sheet 2

INVENTOR.
JOSEPH C. SHARP
BY
ATTORNEYS

United States Patent Office 3,055,511
Patented Sept. 25, 1962

3,055,511
COMPOSITE SIDE BOOM
Joseph C. Sharp, Tulsa, Okla., assignor to Midwestern Manufacturing Company, Tulsa, Okla., a corporation of Oklahoma
Filed Feb. 5, 1962, Ser. No. 170,909
3 Claims. (Cl. 212—8)

This invention relates to a side boom for tractors. More particularly, the invention relates to a composite side boom for tractors wherein all of the winches, power units for driving the winches and so forth are integrally contained within the side boom so that it may be quickly connected and disconnected from a tractor.

Side booms are used with tractors as a means of lifting loads. One particular use is in the laying of pipe lines in the earth. Many different arrangements have been invented for supporting the side booms to the tractors, but most of the known arrangements involve relatively complicated frameworks which must extend across the top or under the tractor. For this reason the known types of side booms are not only expensive to manufacture and difficult to attach and detach from a tractor, but also frequently interfere with the visual paths of the tractor operator.

Side booms are normally attached to tractors more or less as an ancillary piece of equipment, that is, tractors usually are equipped with bulldozer blades, loader mechanisms and so forth on the front portion of the tractor and the side boom is attached as supplementary equipment to the side of the tractor. Each tractor, in most construction work, is utilized for several different purposes, so it is important to provide a side boom which can be easily detached from the tractor when the tractor is being used for the type of construction not involving the laying of underground lines and so forth requiring the side boom.

It is therefore an object of this invention to provide a composite side boom for tractors wherein the winch and winch actuating mechanisms required for the operation of the side boom are integrally contained.

Another object of this invention is to provide a side boom for use with a tractor compositely arranged in a manner such that the side boom may be quickly connected or disconnected from the tractor.

Another object of this invention is to provide a side boom for use with a tractor having an arrangement whereby the side boom does not interfere with the normal operation of the tractor and does not impair the field of vision of the tractor operator.

Another object of this invention is to provide, in conjunction with a composite side boom for a tractor, a limit control means whereby the upward travel of the boom is automatically stopped as the boom reaches a substantially upright position.

Another object of this invention is to provide a composite side boom for tractors which is more economical to construct and simpler to assemble than known types of side booms.

These and other objects and a better understanding of the invention may be had by referring to the following description and claims taken in conjunction with the attached drawings, in which:

This invention may be described as a composite side boom. More particularly, but not by way of limitation, the invention may be described as a composite side boom for a tractor for lifting a load, comprising, in combination: an elongated unitary framework pivotably supported at one end thereof to said tractor; a boom winch supported to said framework; a boom pulley rotatably supported to said framework at the end thereof opposite said end supported to said tractor; a boom cable windably supported on said boom winch and extending from said winch over said boom pulley and to said tractor, the free end of said boom cable affixed to said tractor; a load winch supported to said framework; a load pulley rotatably supported to said framework at the end thereof opposite said end supported to said tractor; and a load cable windably supported on said load winch and extending from said winch over said load pulley, the free end thereof adaptable to connect to said load.

Figure 1:
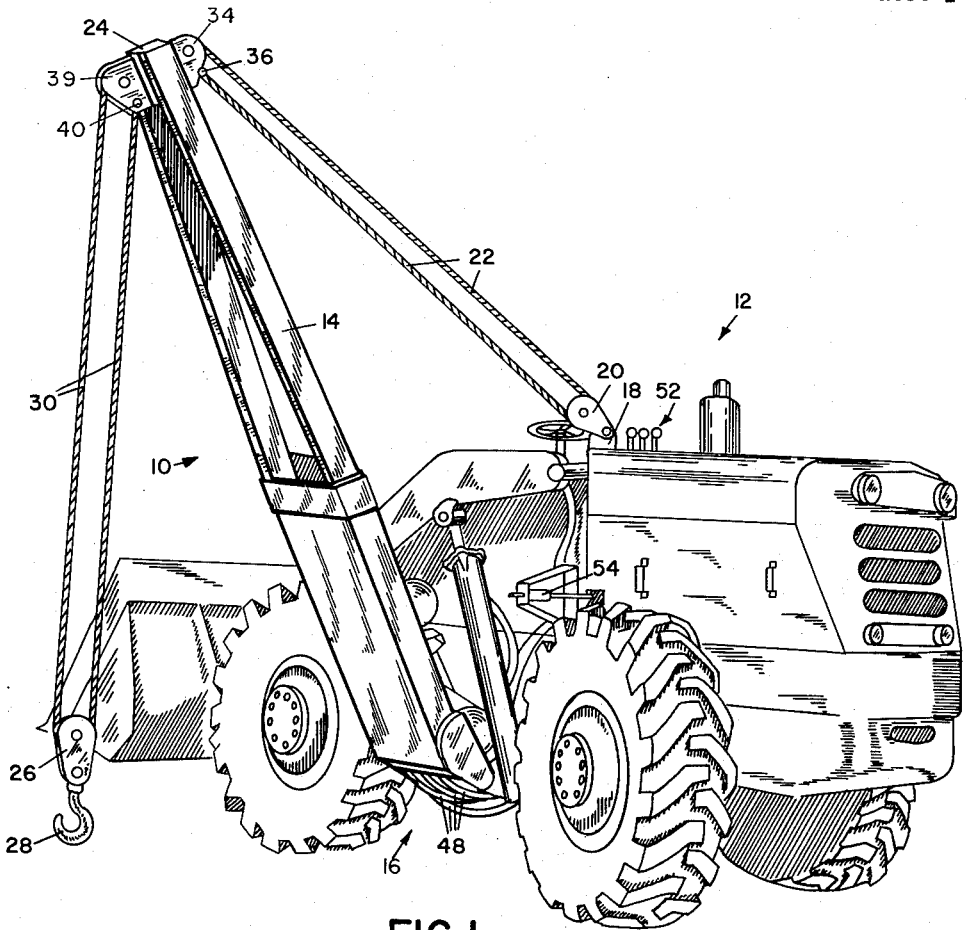
FIGURE 1 is an isometric side view of a tractor having the composite boom of this invention attached.

Referring now to FIGURE 1, the numeral 10 refers generally to the composite side boom of the invention shown supported to a tractor 12. The tractor 12 of FIGURE 1 is strictly by way of example only as the composite side boom 10 may be adapted with equal facility to any type of tractor, and is also especially adaptable to crawler type tractors. When the word tractor is used in this invention, it includes any type of mobile vehicle used in construction work adaptable to receive and utilize a side boom.

Side boom 10 consists of a framework 14 which is typically formed of commonly available structural members. The side boom 10 is pivotally affixed at the base 16 to the tractor 12.

The side boom 10 is arranged to pivot in relation to the tractor 12 through an arc of approximately 90°. In the vertical position the side boom is drawn near the tractor 12 so that the total width of the tractor with its mounted equipment is not increased by the side boom 10. The side boom may be lowered from the vertical position down to the horizontal and even to an extent below the horizontal position if necessary. Typically, the side boom is utilized when supporting loads at an attitude less than horizontal. FIGURE 1 shows side boom 10 pivoted to an attitude intermediate the vertical and horizontal positions.

A tractor pulley support 18 is affixed to the upper portion of the tractor 12 and pivotally supports a boom tractor pulley 20. Boom cables 22 extending from the boom tractor pulley 20 to the pulley end 24 of framework 14 are utilized, in a manner to be described subsequently, to vary the attitude of the side boom 10 relative to the tractor 12.

A load pulley 26, which may be provided with a hook 28, is supported to the pulley end 24 of the side boom 10 by means of load cable 30. The distance between the load pulley 26 and pulley end 24 of the side boom may be varied to lift various loads, such as pipe and so forth.

Figure 2:
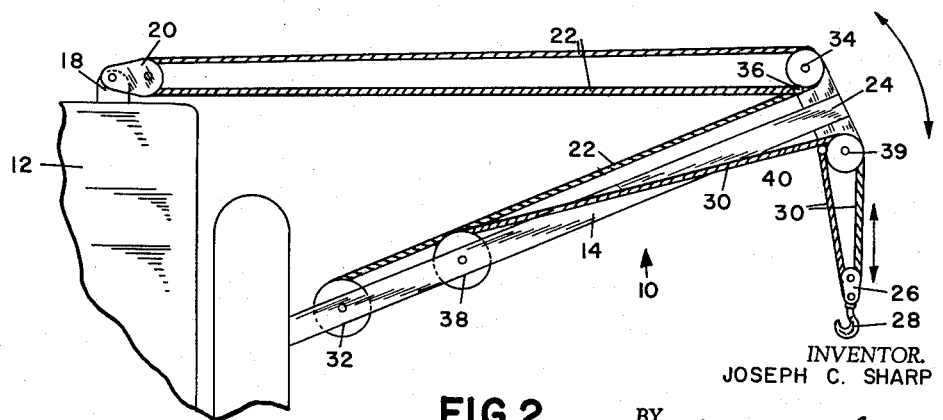
FIGURE 2 is a schematic diagram of the arrangement of the composite side boom of this invention.

Referring to FIGURE 2, the components making up the composite side boom of the invention are shown diagrammatically. Supported in framework 14 is a boom winch 32 adaptable to wind or unwind boom cable 22. Boom cable 22 extends from boom winch 32 around a boom pulley 34 and then around the boom tractor pulley 20 and back to the pulley end 24 where it is affixed at one end at point 36. As boom winch 32 is actuated to wind the boom cable 22 thereon, the length of the cables extending between boom pulley 34 and tractor pulley 20 is shortened and the boom 10 will be pivoted upwarly in a more vertical positon relative to tractor 12. When boom winch 32 is rotated in the opposite direction so that cable 22 is lengthened, the side boom 10 pivots downwardly to extend in a more horizontal position relative to tractor 12. It can be seen that tractor pulley 20 may be eliminated and that the end point 36 of boom cable 22 could be affixed directly to tractor pulley support 18, and the boom then would function in exactly the same manner except that the arrangement shown in FIGURE 2 provides a mechanical advantage so that the force on cable 22 is reduced by 50%. Various other pulley arrangements may be utilized to provide greater mechanical advantages if desired, all of which would be within the purview of this invention.

Supported to the framework 14 of the composite side boom 10 is a load winch 38. As load cable 30 is wound on load winch 38, the length of load cable 30 extending to load pulley 26 is reduced, raising any load attached to hook 28. It is noted that load cable 30 is affixed at one end at point 40 to the pulley end 24 of boom framework 14 so that a mechanical advantage is applied to load pulley 26. The end of point 40 of load cable 30 may be affixed directly to hook 28 to eliminate the requirement of load pulley 26.

Figure 3:
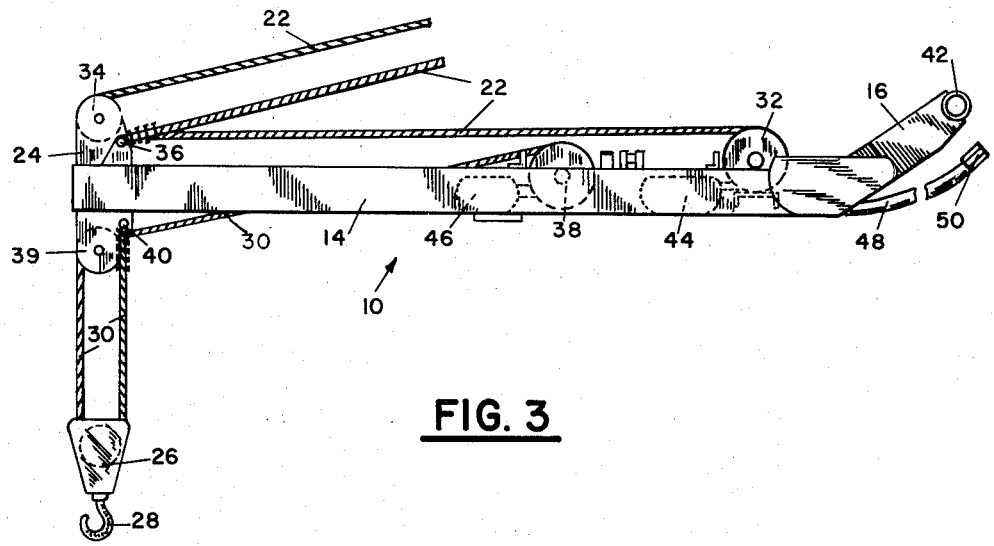
FIGURE 3 is a side view of the composite side boom of this invention detached from the tractor.
Figure 4:
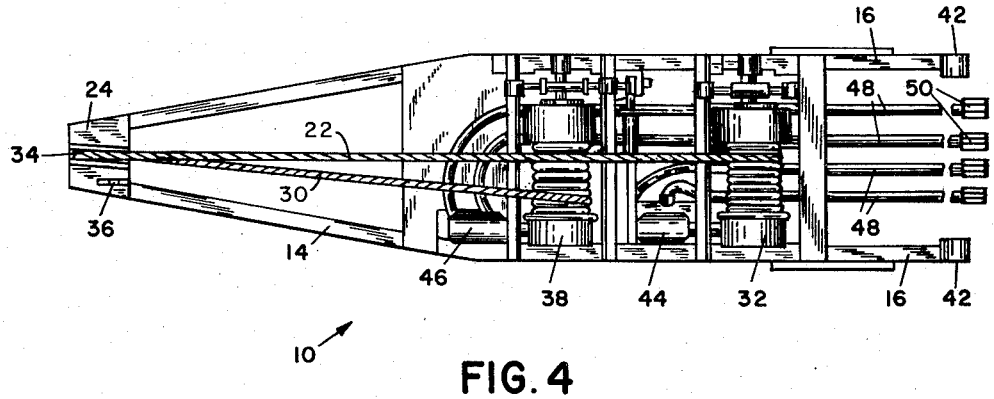
FIGURE 4 is a top view of the detached composite side boom of this invention.

Details of an actual embodiment of the principle of this invention are shown in FIGURE 3 and FIGURE 4. FIGURE 3 is a side view showing the composite side boom 10 of the invention disconnected from the tractor. Typically, the composite side boom 10 is pivotally supported to the tractor by a pivot member 42 affixed to base 16. Any type of pivotal arrangement is within the purview of this invention. Boom winch 32 is powered by a boom hydraulic drive 44 and in like manner load winch 38 is powered by a load hydraulic drive 46. Hydraulic drive units 44 and 46 receive hydraulic fluid pressure by hoses 48 which extend to connect to hydraulic pressure sources on the tractor by means of quick disconnecting devices 50. Controls 52 (see FIGURE 1) on tractor 12 may be operated by the tractor driver to conduct hydraulic fluid to hydraulic drive units 44 and 46 to rotate boom winch 32 and load winch 38 to control the positioning of the side boom 10 and also the raising and/or lowering of hook 28.

When the composite side boom 10 of this invention is to be attached to a tractor 12, the only requirements are: One, that a pivot bolt (not shown) be inserted into pivot 42, pivoting the boom to the tractor; two, the hydraulic hoses 48, by means of connectors 50, are connected to the hydraulic control system of the tractor; and third, boom tractor pulley 20 is connected to tractor pulley support 18. The composite side boom of this invention may be connected or disconnected to a tractor by one man in a few minutes. There are no cables extending across and over the top of the tractor 12 to interfere with the vision of the operator. The composite boom 10 of this invention provides a means of integrally placing all of the necessary components to make a functionable side boom for a tractor in an integral arrangement so that a tractor can be inexpensively and quickly adapted for side boom work.

The use of hydraulic drive devices 44 and 46, although the preferred embodiment, is merely exemplary as any other type of drive means may be provided for winches 32 and 38.

Many refinements may be made to the invention, an important one being a limit control means, indicated in FIGURE 1 generally by the numeral 54, which is engaged when side boom 10 is in its maximum upright position. When the operator actuates controls 52 to raise the side boom 10 uprightly, as the side boom reaches its maximum upright attitude, the limit control means 54 is engaged by framework 14 to automatically terminate the rotation of boom winch 32. Other refinements include the provision of quick disengaging clutches which may be provided with load winch 38 so that during application of the invention, if a load is being lifted which is too heavy according to the weight of the tractor so that it appears that the tractor may be turned over, the operator can, by hitting the proper conrols 52, quickly disengage load winch 38 from load hydraulic device 46 so that the load winch 38 will immediately unwind, dropping the load.

These are typical of the many variations which can be made in the invention as set forth primarily in the schematic diagram of FIGURE 2. The structural arrangement is merely exemplary of the invention.

Although the invention may be described in a certain degree of particularity, it is manifested that many changes may be made in the details of construction and the arrangement of components without departing from the spirit and scope of this disclosure.

What is claimed:

1. A composite side boom for a tractor for lifting a load, comprising, in combination;
   an elongated unitary framework pivotably supported at one end thereof to said tractor;
   a boom winch supported to said framework;
   a boom pulley rotatably supported to said framework at the end thereof opposite said end supported to said tractor;
   a boom cable windably supported on said boom winch and extending from said winch over said boom pulley and to said tractor, the free end of said boom cable affixed to said tractor;
   a load winch supported to said framework;
   a load pulley rotatably supported to said framework at the end thereof opposite said end supported to said tractor;
   and a load cable windably supported on said load winch and extending from said winch over said load pulley, the free end thereof adaptable to connect to said load.

2. A composite side boom for a tractor having a boom tractor pulley mounted thereon, said composite side boom adaptable to control the positioning of a load pulley, comprising, in combination;
   a framework pivotably supported at one end to said tractor;
   a boom winch supported on said framework;
   a boom pulley rotatably supported on said framework at the end thereof opposite said end supported to said tractor;
   a boom cable extending from said boom winch over said boom pulley and said boom tractor pulley, the free end of said boom cable affixed to said framework whereby as said boom cable is wound on said boom winch said framework is pivoted towards a vertical position;
   a load winch supported on said framework;
   a boom load pulley rotatably supported on said framework at the end thereof opposite said end supported to said tractor;
   a load cable extending from said load winch over said boom load pulley and load pulley, the free end of said load cable affixed to said framework whereby as said load cable is wound on said load winch said load pulley is raised;
   means of controllably and reversibly rotating said boom winch;
   and means of controllably and reversibly rotating said load winch.

3. A mechanism for lifting and moving a load, comprising, in combination;
   a tractor;
   an elongated unitary side boom framework pivotably supported at one end thereof to said tractor;
   a boom winch supported to said framework;
   a boom pulley rotatably supported to said framework at the end thereof opposite said end supported to said tractor;
   a boom cable windably supported on said boom winch and extending from said winch over said boom pulley and to said tractor, the free end of said boom cable affixed to said tractor;

a load winch supported to said framework;

a load pulley rotatably supported to said framework at the end thereof opposite said end supported to said tractor;

and a load cable windably supported on said load winch and extending from said winch over said load pulley, the free end thereof adaptable to connect to said load;

a limit control means affixed to and extending from said tractor adaptable to engage said framework as said framework is pivoted to substantially upright position;

and control means operable by said limit control means to discontinue the rotation of said boom pulley when said framework engages said limit control means.

References Cited in the file of this patent

UNITED STATES PATENTS

| | | |
|---|---|---|
| 1,725,952 | Beebe | Aug. 27, 1929 |
| 2,723,767 | Bechman | Nov. 15, 1955 |
| 3,005,559 | Toderick | Oct. 24, 1961 |